(12) United States Patent
Muramatsu et al.

(10) Patent No.: US 8,143,539 B2
(45) Date of Patent: Mar. 27, 2012

(54) LEVER SWITCH

(75) Inventors: Toru Muramatsu, Saitama (JP); Masahito Kobayashi, Saitama (JP)

(73) Assignee: Toyo Denso Kabushiki Kaisha, Tokyo (JP)

( * ) Notice: Subject to any disclaimer, the term of this patent is extended or adjusted under 35 U.S.C. 154(b) by 721 days.

(21) Appl. No.: 12/292,233

(22) Filed: Nov. 14, 2008

(65) Prior Publication Data
 US 2009/0127079 A1   May 21, 2009

(30) Foreign Application Priority Data
 Nov. 16, 2007 (JP) ................. 2007-298493

(51) Int. Cl.
 *H01H 9/00* (2006.01)
(52) U.S. Cl. .................................. 200/61.54
(58) Field of Classification Search ............ 200/61.27, 200/61.54–61.57
 See application file for complete search history.

(56) References Cited

U.S. PATENT DOCUMENTS

| 6,586,692 B2 * | 7/2003 | Agetsuma .............. 200/61.54 |
| 6,657,145 B1 | 12/2003 | Huang |
| 7,161,104 B2 * | 1/2007 | Bergh et al. .............. 200/305 |

FOREIGN PATENT DOCUMENTS

| JP | 2002-166832 | 6/2002 |
| JP | 2004-349209 | 12/2004 |

* cited by examiner

*Primary Examiner* — Renee Luebke
*Assistant Examiner* — Marina Fishman
(74) *Attorney, Agent, or Firm* — Jean C. Edwards, Esq.; Edwards Neils PLLC

(57) ABSTRACT

An operation lever comprises a main section, a cover section and a photoconductor. While the photoconductor is overlaid on the main section, sliding protrusions of the cover section are inserted into guide grooves formed in the periphery of the main section, the cover section is slidingly pushed to insert a tip end section of the cover section inside an overhanging fringe of the main section. An engaging protrusion and an engaging pawl of the cover section are engaged with the main section to assemble the operation lever.

5 Claims, 18 Drawing Sheets

LEVER SWITCH

CROSS-REFERENCE TO RELATED APPLICATIONS

The present application claims priority from Japanese Patent Application No. 2007-298493, filed Nov. 16, 2007, the contents of which are herein incorporated by reference in their entirety.

FIELD OF THE INVENTION

The present disclosure relates to a lever switch installed on a steering wheel and turned ON by pulling up its operation lever with a fingertip toward the driver. More particularly, the present disclosure relates to a lever switch having a thin operation lever provided with a photoconductor having a high degree of freedom in shape and position.

DESCRIPTION OF RELATED ART

Various lever switches for steering wheels are known. For example, a lever switch has an operation lever, and the operation lever includes a combination of a main section and a cover section. The main section and the cover section are integrated together with screws (refer to Japanese Patent Application Laid-Open Publication No. 2002-166832).

Furthermore, another lever switch has a photoconductor which is integrated with an operation lever of the lever switch by insert molding or the like so that the photoconductor guides light from a light source in a base section of the operation lever to a tip end section of the operation lever (refer to Japanese Patent Application Laid-Open Publication No. 2004-349209).

Since a lever switch for a steering wheel is disposed in a limited space formed between a wheel section and a spoke section of the steering wheel, the lever switch is required to be thin and compact in size and to have a predetermined strength. However, in the related-art lever switch in which the main section and the cover section of the operation lever are aligned face-to-face and integrated together with screws, it is necessary to provide bosses having a predetermined length for screw fastening. Hence, the operation lever becomes thick by the bosses. Moreover, in the case that a photoconductor is provided inside the operation lever, the photoconductor is required to be disposed so as to avoid the bosses. As a result, the degree of freedom in the position of the photoconductor is decreased. Still further, in the case that a photoconductor is integrated with the operation lever by insert molding, the degree of freedom of the photoconductor is also decreased.

SUMMARY OF INVENTION

Exemplary embodiments of the present invention provide a lever switch in which an operation lever of the lever switch has a combination of a main section and a cover section, which are integrated together without using screws, and in which a photoconductor is held between the main section and the cover section to attain a thin lever switch and a high degree of freedom in the design of the photoconductor.

According to a first aspect of the invention, a lever switch is provided with a base and an operation lever attached rotatably on the base, the operation lever having a main section having a first engaging section, a cover section having a second engaging section and a photoconductor disposed between the main section and the cover section, wherein the main section opposes to the cover section, and the first engaging section engages with the second engaging section to integrate the main section and the cover section.

According to a second aspect of the invention, one of the first engaging section and the second engaging section may be an overhanging fringe, and the other of the first engaging section and the second engaging section may be a fringe portion, and wherein the fringe portion may fits inside the overhanging fringe.

According to a third aspect of the invention, an engaging groove may be provided inside the overhanging fringe, an engaging protrusion may be provided on the fringe portion so as to protrude from the fringe portion, and the engaging groove may engage with the engaging protrusion.

According to a fourth aspect of the invention, the main section and the cover section may have photoconductor positioning sections, respectively, and the photoconductor may be held between the photoconductor positioning sections.

According to a fifth aspect of the invention, the photoconductor may have a slope section serving as a reflecting plane at one end section of the photoconductor, the slope section of the photoconductor may be held between slope sections provided on the corresponding portions of the main section and the cover section, and the slope section of the main section or the cover section may have a marked section for emitting light using the light guided to the slope section of the photoconductor.

According to a sixth aspect of the invention, a lever switch assembling method is provided with preparing a main section having a first engaging section, a cover section having a second engaging section and a photoconductor, slidingly moving relatively the first engaging section to the second engaging section so as to integrate the main section with the cover section with the photoconductor while holding the photoconductor between the main section and the cover section.

Other features and advantages may be apparent from the following detailed description, the accompanying drawings and claims.

DETAILED DESCRIPTION OF THE PREFERRED EMBODIMENT

An embodiment of a lever switch provided on a steering wheel of a vehicle will be described below on the basis of the drawings.

Figure 1:
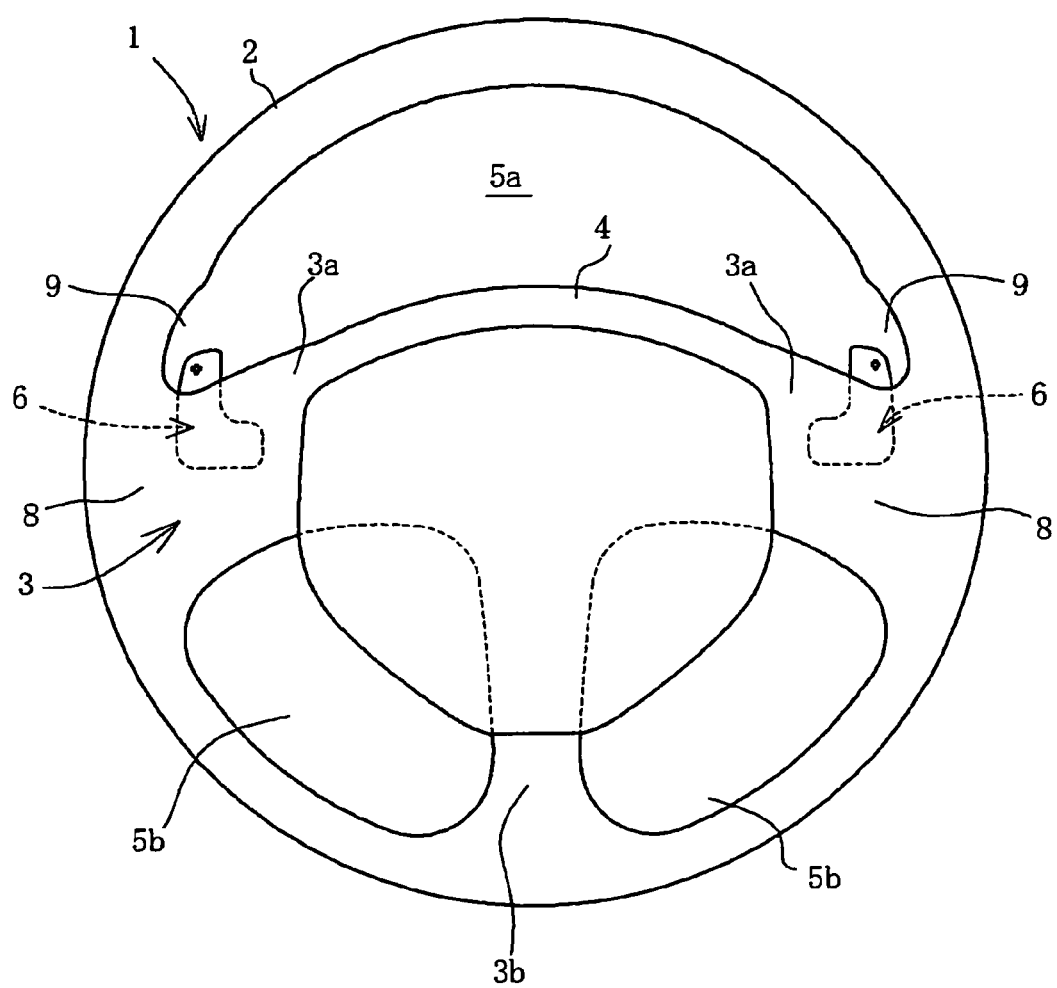
FIG. 1 is a front view showing a steering wheel of a vehicle according to an embodiment of the present invention.

FIG. 1 is a front view showing a steering wheel 1 of a vehicle according to the embodiment. In the embodiment, the side which the driver faces is assumed to be a front face or front side, and the opposite side is assumed to be a rear face or rear side. Furthermore, the operation of moving the operation lever of the lever switch toward the driver is referred to as pull-up operation. Moreover, the standard states of the operation lever in the up-down and left-right directions are assumed to be the states obtained when the operation lever mounted on the vehicle is used, and the standard states are the states shown in FIG. 1.

The steering wheel 1 comprises a ring-shaped wheel section 2 and a spoke section 3 extending toward the radial direction from the central section of the steering wheel 1 and connected to the wheel section 2. At least the central section of the spoke section 3 is covered with a center pad 4.

The spoke section 3 comprises a horizontal spoke 3a and a vertical spoke 3b. The horizontal spoke 3a extends in a nearly left-right direction, and the vertical spoke 3b extends in the up-down direction on the lower half side of the steering wheel 1. The spokes 3a and 3b are formed into a nearly T shape.

An upper space 5a having a nearly semicircular shape is formed between an upper portion of the horizontal spoke 3a and an upper half side portion of the wheel section 2. On a lower side of the horizontal spoke 3a, lower spaces 5b are formed on the left and right sides of the vertical spoke 3b using the vertical spoke 3b for the partition.

A lever switch 6 is installed between the center pad 4 and the wheel section 2 on the rear face of the horizontal spoke 3a on each of the left and right sides of the horizontal spoke 3a. A part of the lever switch 6 protrudes into the upper space 5a so that the operation lever of the lever switch can be pulled up with a fingertip while the wheel section 2 is gripped with one hand.

The lever switch 6 serves as a shift switch provided on each of the left and right sides of the horizontal spoke 3a. The right-side lever switch 6 is used for shift up and the left-side lever switch 6 is used for shift down, for example. Each time the lever switch 6 is pulled up, it outputs an ON signal and performs shift up or shift down.

Since the left-side and right-side lever switches 6 have same structure, only the right-side lever switch 6 will be described below.

Figure 2:
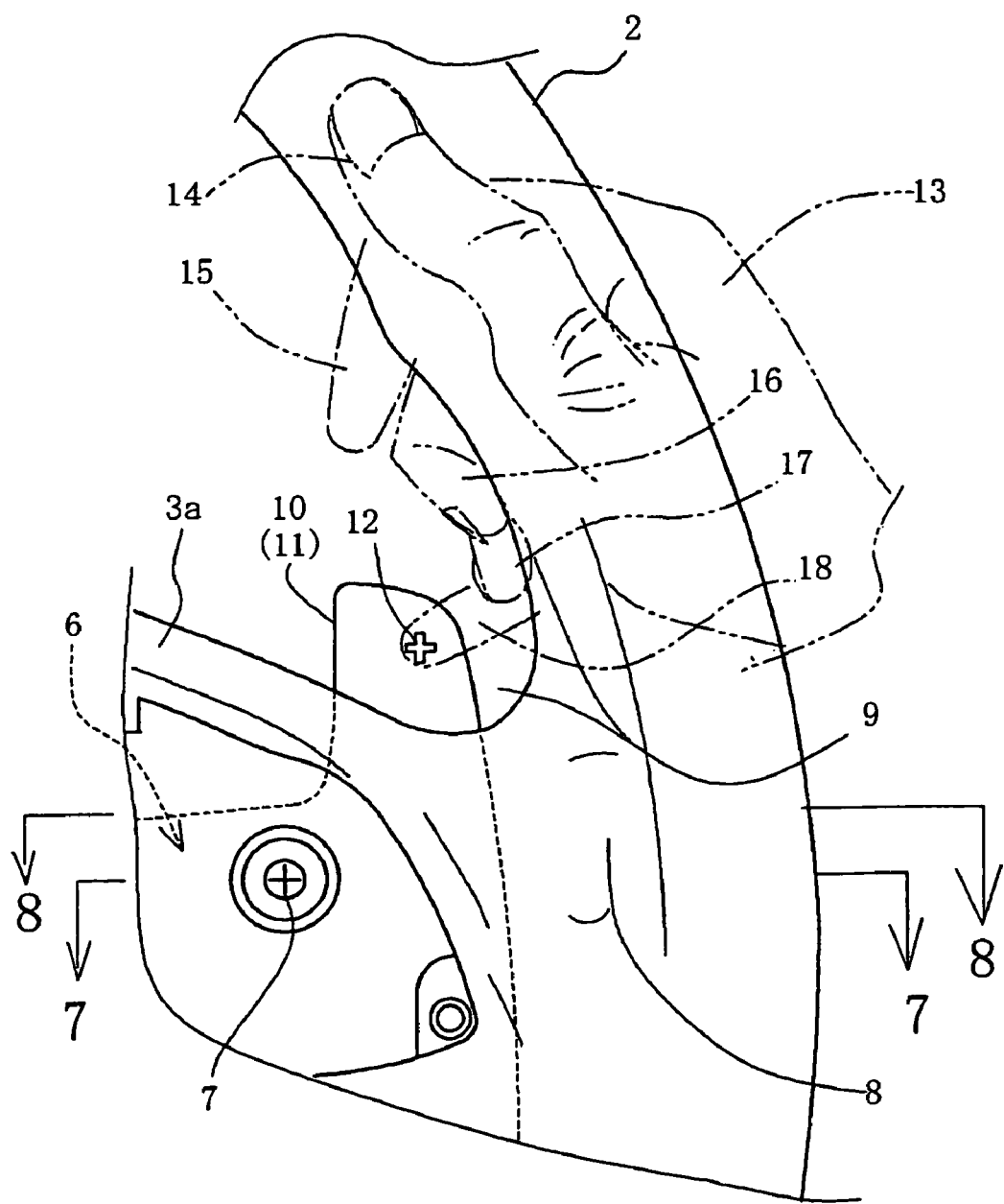
FIG. 2 is a view showing part of the steering wheel in the proximity of a lever switch.

FIG. 2 is a view showing part of the steering wheel 1 in the proximity of the right-side lever switch 6. The lever switch 6 is installed using a screw 7 from the front side of the horizontal spoke 3a. The center pad 4 is not shown in this figure.

A protruding section 11 serving as the operation lever 10 of the lever switch 6 protrudes upward beyond the horizontal spoke 3a into a curved section 9 in the proximity of connecting section 8 of the horizontal spoke 3a and the wheel section 2 so that a marked section 12 can be visually recognized from the front side. The marked section 12 emits light using the light guided by a photoconductor. In the embodiment, a "+ (plus)" mark indicating shift up is placed. On the left-side lever switch 6, not shown, a "− (minus) mark" indicating shift down is placed.

The operation lever 10 is pulled up to perform ON operation by pressing the rear side toward the front side using a fingertip while the wheel section 2 in the proximity of the horizontal spoke 3a and above the horizontal spoke 3a is gripped with a right hand 13. In FIG. 2, the right hand 13 has a thumb 14, an index finger 15, a middle finger 16, a third finger 17, and a little finger 18. Either one of the fingers can be used to operate the operation lever 10. In the embodiment, the little finger 18 is used for the operation.

Furthermore, the protruding section 11 protrudes upward from the horizontal spoke 3a to a position that lies within the reach of either one of the fingers while the wheel section 2 is gripped with the right hand and that the protruding section 11 can be visually recognized from the front side.

Figure 3:
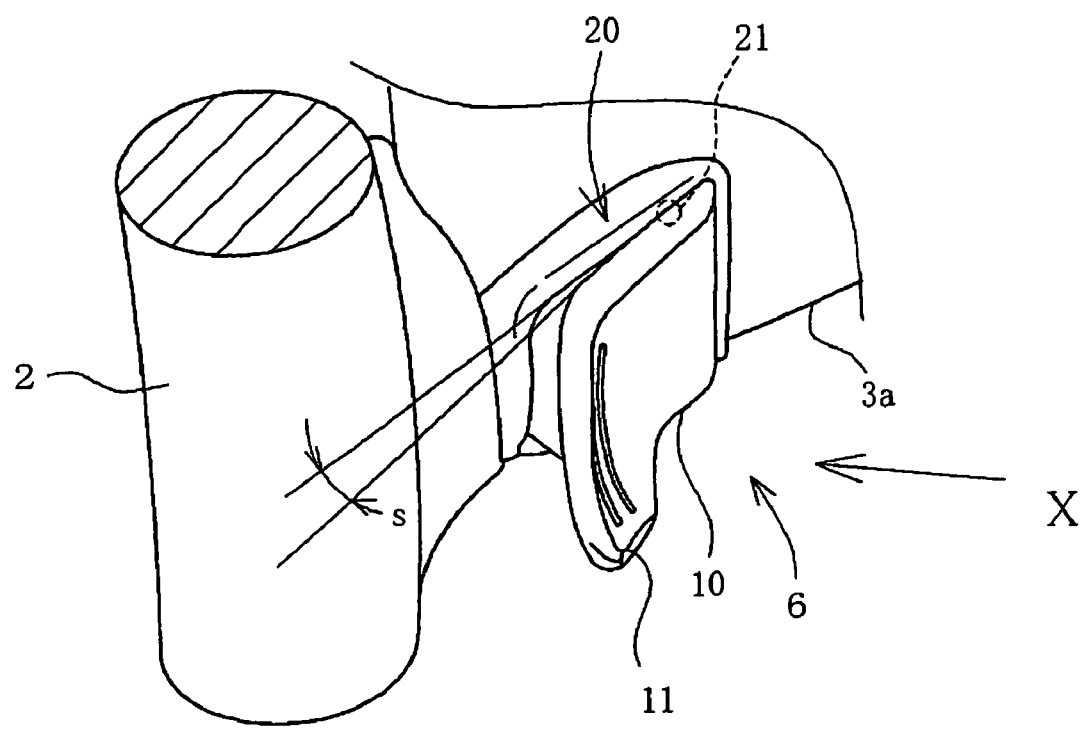
FIG. 3 is a perspective view showing part of the lever switch as viewed from the rear side.

FIG. 3 is a perspective view showing part of the steering wheel 1 and the lever switch 6 as viewed from the rear side. As shown in FIG. 3, the lever switch 6 has the operation lever 10 and a base 20. The base 20 is installed on the rear face of the horizontal spoke 3a and secured to the horizontal spoke 3a. The operation lever 10 is rotatably connected to the base 20 via a fulcrum shaft 21 described later.

An outer end portion of the operation lever 10 on the side of the wheel section 2 is apart from the base 20 toward the rear side of the wheel section 2 by a stroke amount S, and an edge of the outer end portion of the operation lever 10 on the side of the wheel section 2 is curved rearward.

Figure 4:
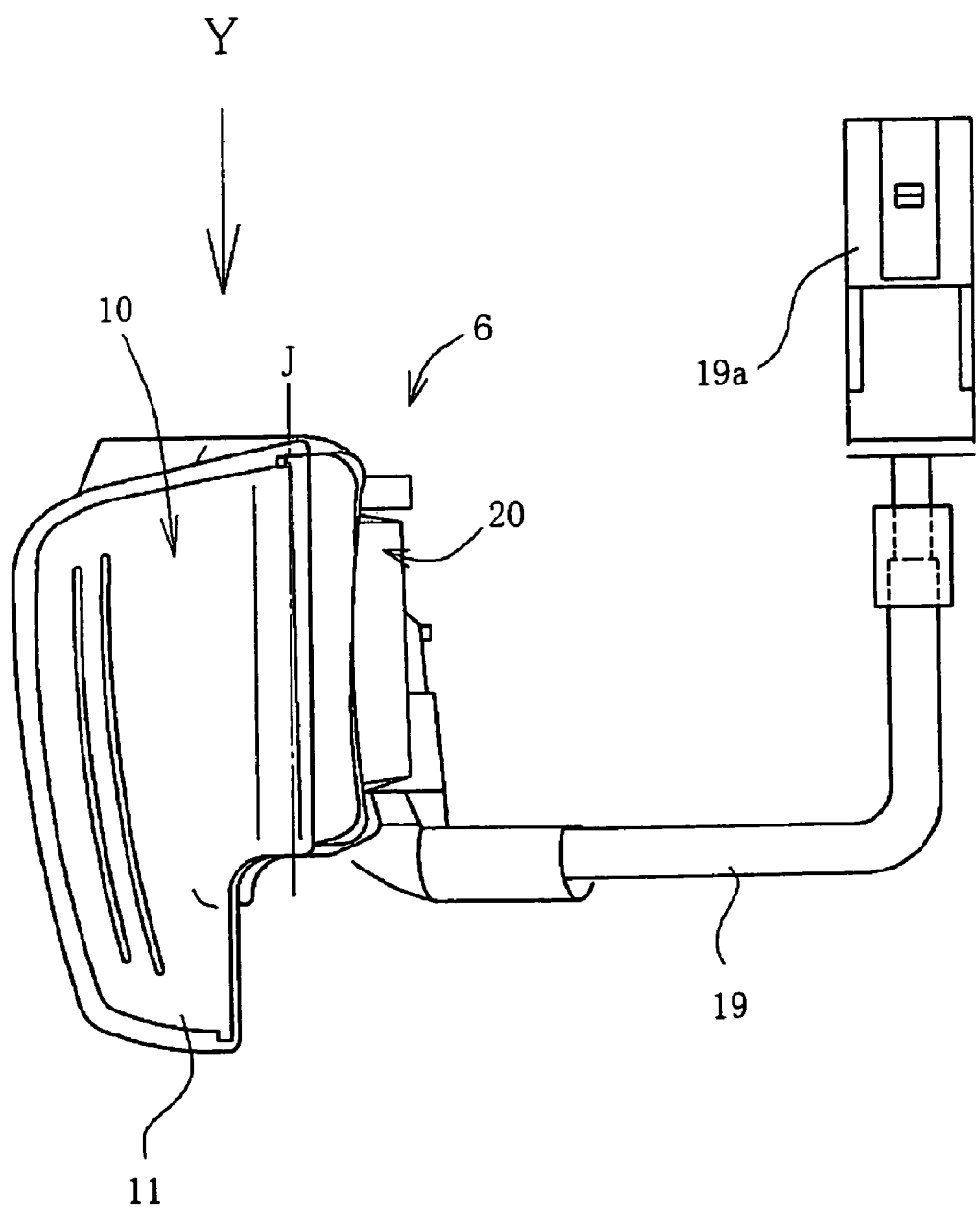
FIG. 4 is a view showing the lever switch.
Figure 5A:
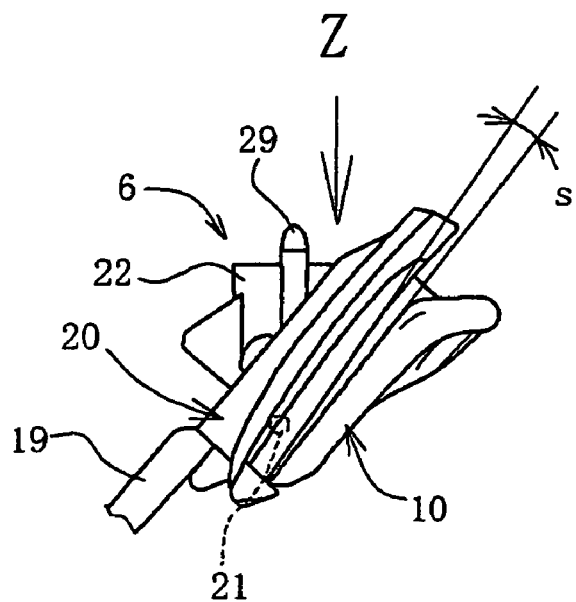
FIG. 5A is a view showing the lever switch in an assembled state and FIG. 5B is a view showing the lever switch in an exploded state.
Figure 6:
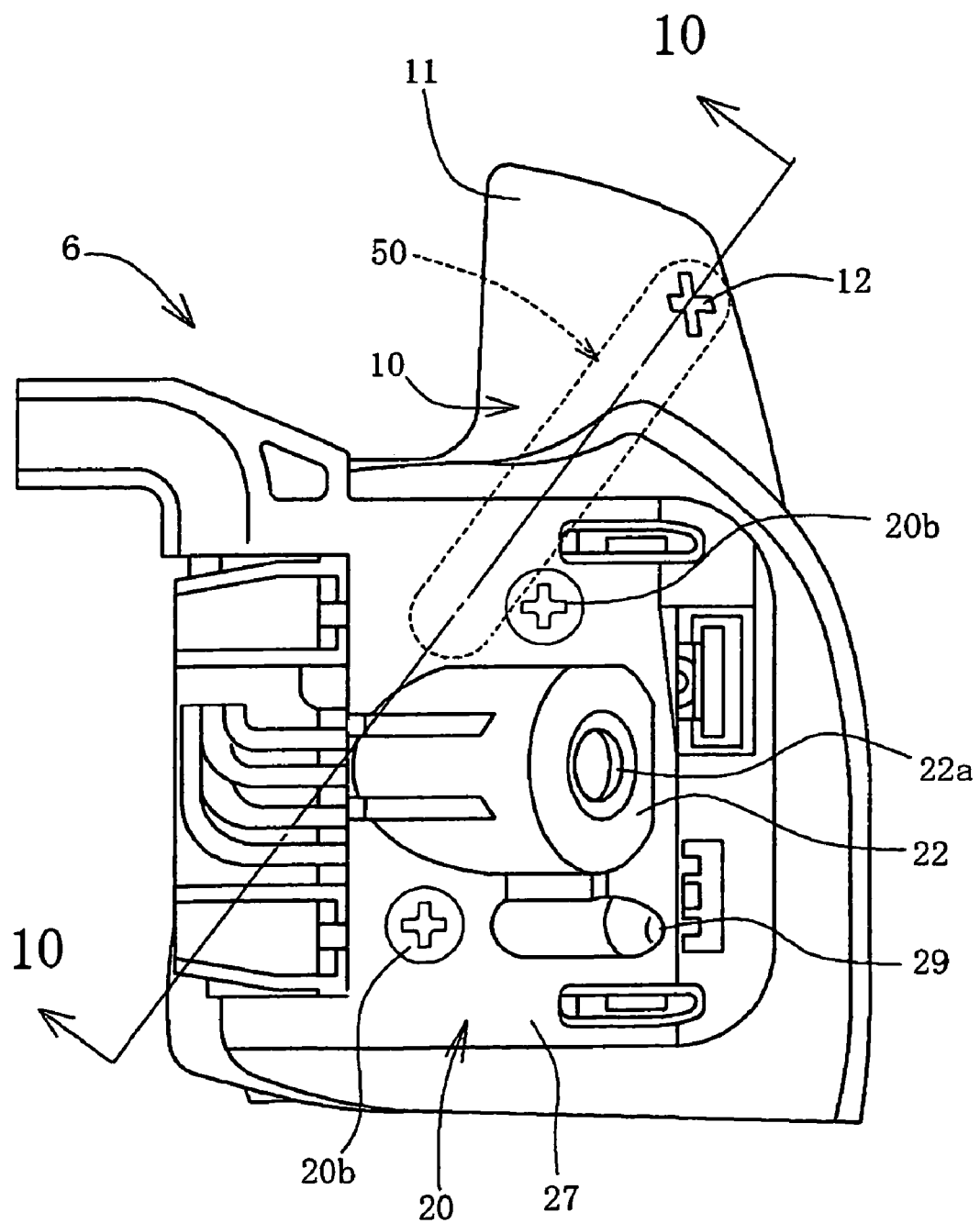
FIG. 6 is a view showing the rear face of the lever switch.

FIG. 4 is a view showing the lever switch 6 as viewed in the direction indicated by arrow X of FIG. 3. FIG. 5A is a view showing the lever switch 6 as viewed in the direction indicated by arrow Y of FIG. 4. FIG. 6 is a view showing the lever switch 6 as viewed in the direction indicated by arrow Z of FIG. 5A.

In FIG. 4, a cord 19 has one end connected to a circuit board described later and the other end connected to an engine control circuit not shown. The cord 19 is used to transmit the ON signal of the lever switch 6 and to supply electric power to a chip LED described later. The rotation center axis line J of the operation lever 10 corresponds to the center line of the fulcrum shaft 21.

As shown in FIG. 5A, in the lever switch 6, the base end section of the operation lever 10 is connected to the base 20 via the fulcrum shaft 21. A boss 22 is formed on the rear face of the base 20, and the lever switch 6 is fastened with a screw to the horizontal spoke 3a at the boss 22.

A positioning pin 29 is used to position the lever switch 6 when the lever switch 6 is installed on the horizontal spoke 3a.

Figure 5B:
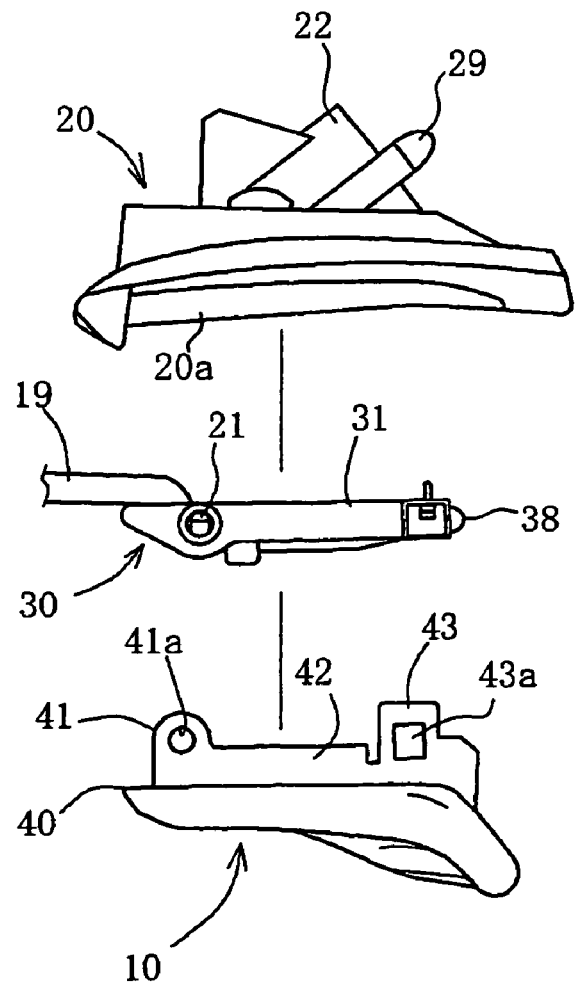

FIG. 5B is an exploded view showing the components of the lever switch 6. The lever switch 6 is assembled by overlaying and integrating the base 20, a switch holder 30 and the operation lever 10.

Figure 9A:
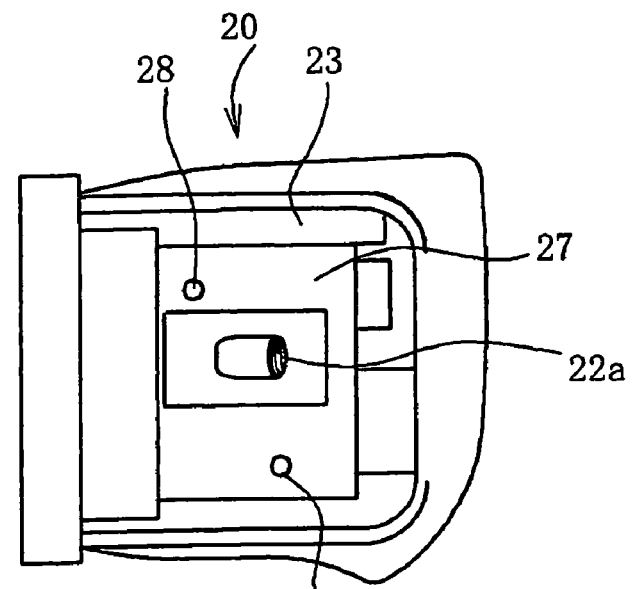
FIGS. 9A to 9C are views showing the alignment faces of the sections constituting the lever switch.
Figure 9B:
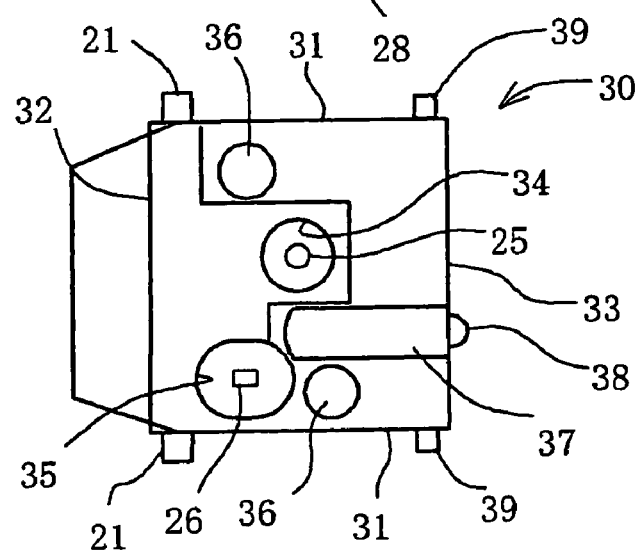
Figure 9C:
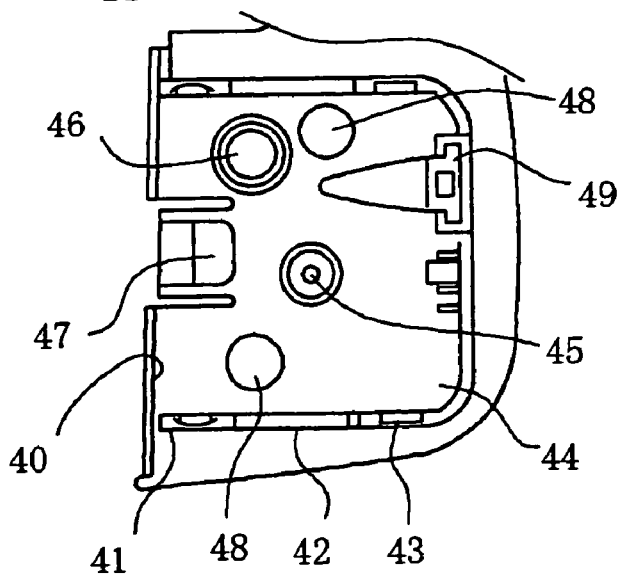

FIGS. 9A, 9B and 9C are views showing the alignment faces of the respective components. FIG. 9A is a view showing the base 20 as viewed from below in FIG. 5B, FIG. 9B is a view showing the switch holder 30 as viewed from below in FIG. 5B, and FIG. 9C is a view showing the operation lever 10 as viewed from above in FIG. 5B.

As shown in FIGS. 5A and 5B and FIGS. 9A, 9B and 9C, the base 20 has a concave section 23 having a nearly rectangular shape to accommodate the switch holder 30. The switch holder 30 is accommodated in the concave section 23 and fastened with screws (see FIG. 6). Holes 28 formed in a bottom section 27 of the base 20 are through holes for receiving the screws that are used to fasten the switch holder 30. At the center of the bottom section 27, an inner end portion of the boss 22 has an inclined opening, and an insert nut 22a is inserted into the inclined opening so as to be integrated with the boss 22.

The switch holder 30 is made of a resin and has a nearly rectangular shape. The fulcrum shaft 21 is formed so as to protrude on the left and right side of the switch holder 30. The fulcrum shaft 21 is provided on one end side in the longitudinal direction of side faces 31 of the switch holder 30. In FIG. 9B, the faces of the switch holder 30 on which the fulcrum shaft 21 is provided are referred to as the side faces 31. Among the left and right ends orthogonal to the side faces 31 in FIG. 9B, the side close to the fulcrum shaft 21 is referred to as a base end section 32, and the opposite side is referred to as a tip end section 33.

In the switch holder 30, a circuit board described later is fitted and integrated into a concave section that is not shown when viewed from above in FIG. 5B. The cord 19 connected to this circuit board extends from the base end section 32.

In FIG. 9B, a hole 34 through which a tact switch 25 is seen is formed at the central section of the switch holder 30, and a hole 35 through which a chip LED 26 is seen is formed in the proximity of the side face 31 on the lower side of FIG. 9B and in the proximity of the fulcrum shaft 21. The hole 35 is a slot formed to allow the operation lever 10 to rock. Numeral 36 designates a boss. A click pin 38 is slidably fitted into the cylindrical click holder section 37 and the click pin 38 protrudes from the tip end section 33. Each of stopper protrusions 39 is provided on each of the sides of the side face 31.

Fulcrum shaft bosses 41 are provided in the proximity of the base end section 40 on the rear face of the operation lever 10 as shown in FIG. 5B. The fulcrum shaft 21 is rotatably fitted into fulcrum shaft holes 41a provided in the fulcrum shaft bosses 41. The fulcrum shaft bosses 41 are formed on a vertical wall section 42 on the side of the base end section 40. Guide sections 43 are provided on the vertical wall section 42 on the side of the other end, i.e., the tip end section, and guide holes 43a having a rectangular shape being long in the up-down direction are provided in the guide sections 43. The stopper protrusions 39 provided on the side faces of the switch holder 30 on the tip end section thereof are inserted into the guide holes 43a to allow the operation lever 10 to rock. In addition, the stopper protrusions 39 make contact with the upper and lower end sections of the guide holes 43a to restrict the rocking range of the operation lever 10.

As shown in FIG. 9C, the vertical wall section 42 is provided on both the left and right side sections and on the tip end section of the operation lever 10, except for the base end section 40 thereof, so as to have a nearly U shape. The vertical wall section 42 encloses a flat section 44 formed inside the operation lever 10. A concave section 45 is making contact with part of the tact switch 25 is formed at the center of the flat section 44. A light-gathering cylinder section 46 is inserted into the hole 35 in the switch holder 30. The light-gathering cylinder section 46 is formed on one side of the operation lever 10 and close to the base end section of the operation lever 10. An engaging concave section 47 and a relieving concave section 48 for the boss 36 of the switch holder 30 are formed on the operation lever 10. A click guide 49 is making contact with the tip end of the click pin 38 of the switch holder 30. The click guide 49 is provided on the side of the tip end section of the vertical wall section 42.

FIG. 6 shows the rear face of the lever switch 6, serving as a mounting face when the lever switch 6 is mounted on the horizontal spoke 3a. The boss 22 is formed at the center of the rear face in an oblique direction. A first screw 20b is installed at an up side of the boss 22, and a second screw 20b is installed at a down side of the boss 22. The screws 20b are used to install the switch holder 30 to the bottom section 27 of the base 20. The screws 20b are inserted into the through holes 28 (see FIG. 9A) provided in the bottom section 27 from the rear side to integrally fasten the switch holder 30.

A photoconductor 50 described later is disposed obliquely inside the operation lever 10 within a range from the proximity of the base section of the boss 22 to the marked section 12.

Figure 7:
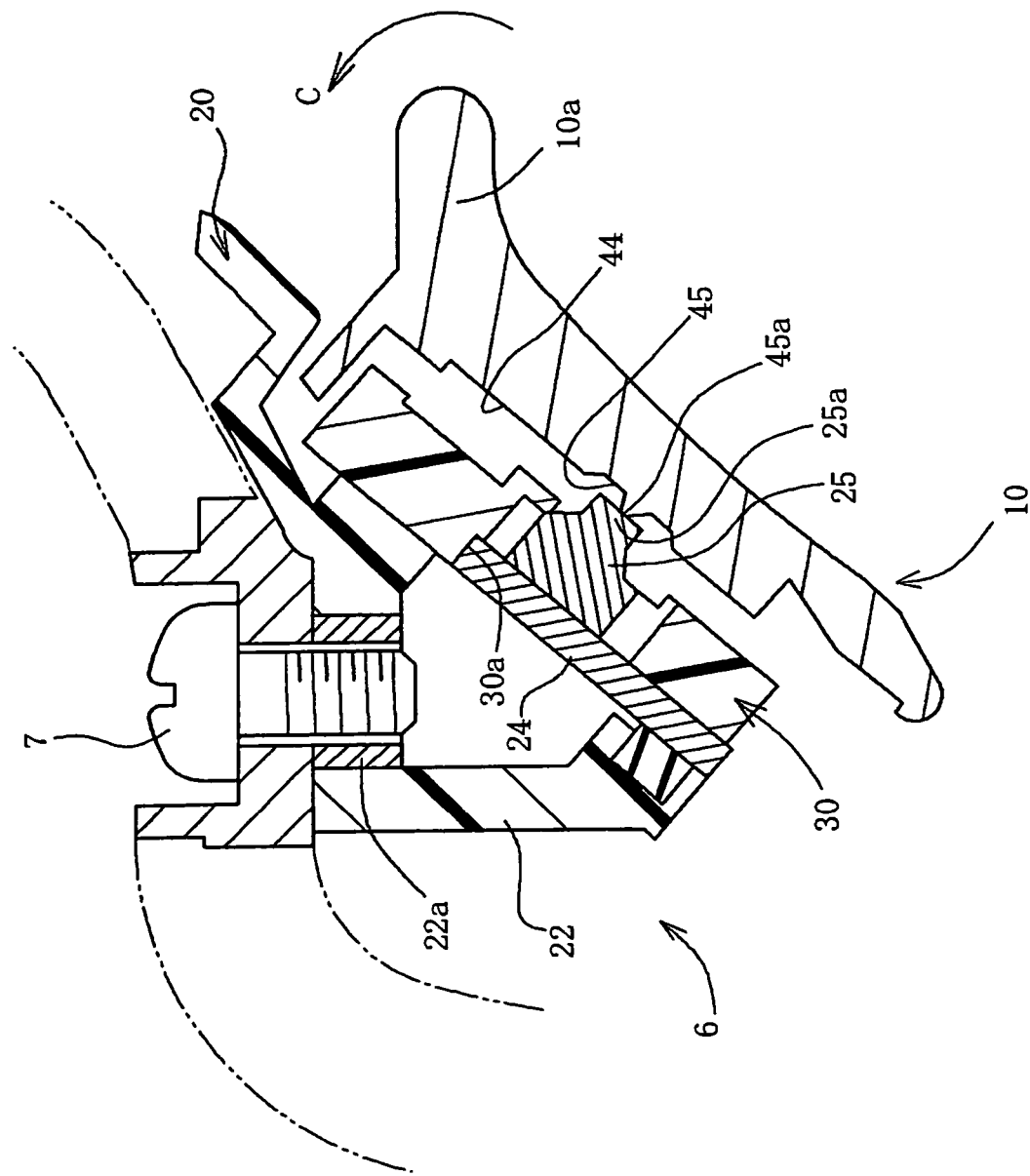
FIG. 7 is a sectional view taken on line 7-7 of FIG. 2.

FIG. 7 is a sectional view taken on line 7-7 of FIG. 2. The base 20 is made of a resin and has the boss 22 integrated with the base 20. The boss 22 is provided with the insert nut 22a. The screw 7 is inserted into the insert nut 22a from the front face side of the horizontal spoke 3a and tightened to fasten the base 20 to the horizontal spoke 3a. The switch holder 30 is integrally accommodated into the base 20. A circuit board 24 is fitted into the concave section 30a of the switch holder 30. The tact switch 25 is installed on the circuit board 24 and electrically connected to the circuit board 24. An operation protrusion 25a is provided at the tip end of the tact switch 25. The operation protrusion 25a enters the concave section 45 of the flat section 44 and makes contact with a protrusion 45a formed at the central section of the concave section 45.

When the tip end section 10a of the operation lever 10 is pulled up and the operation lever 10 is rotated in the direction indicated by arrow C, the protrusion 45a pushes the operation protrusion 25a and turns ON the tact switch 25, and an ON signal is output from the circuit board 24.

Figure 8:
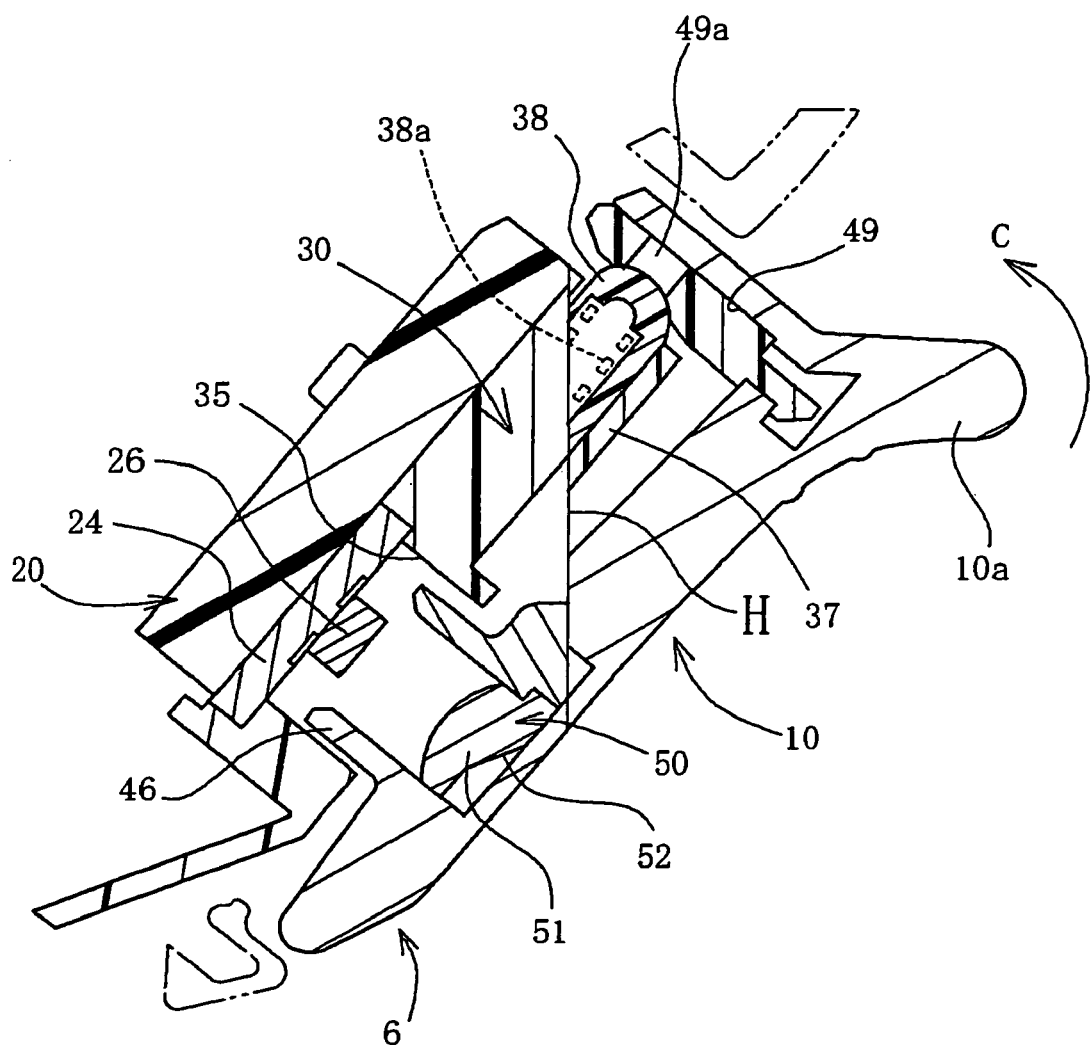
FIG. 8 is a sectional view taken on line 8-8 of FIG. 2.

FIG. 8 is a sectional view taken on line 8-8 of FIG. 2. The chip LED 26 serves as a light source for allowing the marked section 12 to emit light. The chip LED 26 is provided on the circuit board 24 and emits light at all times when the main switch of the vehicle is ON. The light-gathering cylinder section 46 is inserted into the hole 35. The chip LED 26 is accommodated into the hole 35 of the switch holder 30 and transmits light into the light-gathering cylinder section 46. The light-gathering section 51 has the shape of a convex lens and is formed on one end of the photoconductor 50. The light-gathering section 51 is fitted into the light-gathering cylinder section 46.

The click pin 38 is urged by a click spring 38a to protrude from the click holder section 37. Part of the click pin 38 is inserted into the click hole 49a provided in the click guide 49 so that the operation lever 10 is positioned at its neutral position. When the tip end section 10a of the operation lever 10 is pulled up in the direction indicated by arrow C by applying force to the operation lever 10, the tip end of the click pin 38 can be pushed out of the click hole 49a against the click spring 38a and can be rotated. When the force is relieved, part of the click pin 38 is urged by the click spring 38a and inserted again into the click hole 49a, and the operation lever 10 returns to its neutral position. A break line H of FIG. 8 shows the different cross-section.

Figure 10:
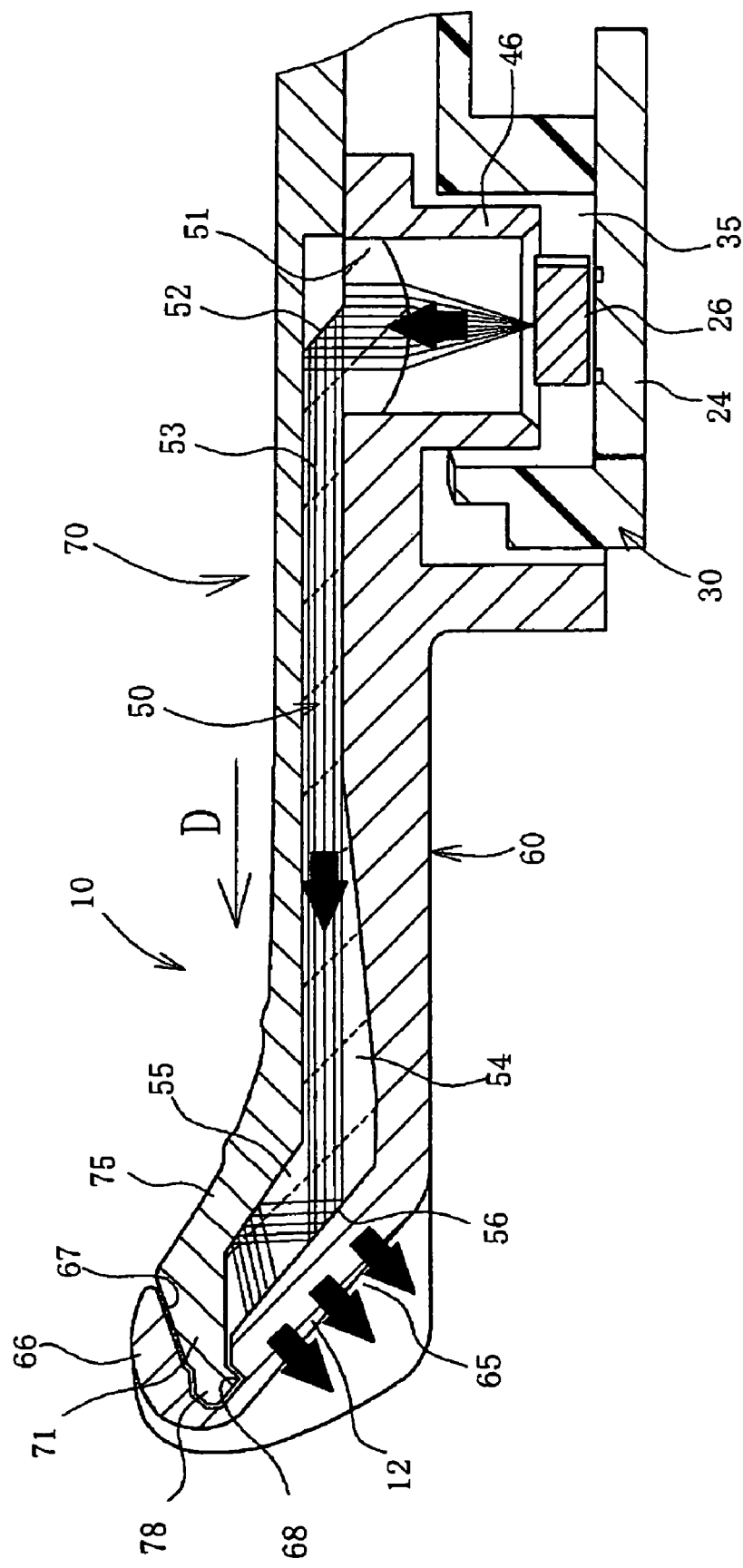
FIG. 10 is a sectional view taken on line 10-10 of FIG. 6.

FIG. 10 is a sectional view taken on line 10-10 of FIG. 6. The operation lever 10 comprises a main section 60, a cover section 70 and the photoconductor 50 as described later. The photoconductor 50 is held between the main section 60 and the cover section 70 of the operation lever 10. A reflecting plane 52 is provided on the side of the cover section 70 at the base end section of the photoconductor 50. The light-gathering section 51 reflects the light emitted from the chip LED 26 and refracts the light 90 degrees toward the tip end of the photoconductor 50. A base side section of the intermediate section 53 of the photoconductor 50 in the longitudinal direction has a constant wall thickness. The upper and lower faces of the base side section are parallel with each other.

A tip side section of the intermediate section 53 is a thick wall section 54. The lower face side of the tip side section is inclined downward toward the tip end and the thickness of the tip side section of the intermediate section 53 increases gradually. The tip side section has a slope section 55. The slope section 55 is held between a slope section 65 of the main section and a slope section 75 of the cover section. The slope section 55 is formed so as to be slightly tapered toward the tip end such that the left and right faces of the slope section become closer and nonparallel to each other and the width becomes narrower toward the tip end. A face facing the slope section 65 of the main section 60 and a face facing the slope section 75 of the cover section 70 of the operation lever 10 serve as reflecting planes 56. The light is reflected complicatedly between the reflecting planes 56 and illuminates the surface of the slope section 55.

The main section 60 and the cover section 70 of the operation lever 10 are coated with black paint or the like in advance so as to be opaque and not to allow light pass through. The paint is removed from the marked section 12 using the laser etching method or the like so that light can pass through only in the marked section 12. As a result, the marked section 12 is allowed to emit light using the light guided by the photoconductor 50 from the light-gathering section 51 to the reflecting planes 56 and can be visually recognized.

The tip end section of the slope section 65 of the main section 60 of the operation lever 10 is bent inward to form an overhanging fringe 66. The tip end section 71 of the cover section 70 is fitted inside this overhanging fringe 66. The inner surface of the overhanging fringe 66 serves as a guide face 67 when the tip end section 71 is inserted. The tip end section 71 is slightly inclined downward with respect to the sliding direction D. An engaging protrusion 78 further protrudes from the tip end section 71. The engaging protrusion 78 is fitted into an engaging groove 68. The engaging groove 68 is formed such that the overhanging fringe 66 is recessed in the sliding direction into the wall of the base section of the main section 60. The base section of the main section 60 is bent from the upper end of the slope section 65. The engaging protrusion 78 has the shape of an arrow head at the tip end and is engaged with the concave and convex section in the engaging groove 68. The concave and convex section matches the shape of the arrow head. Hence, the engaging protrusion 78 is difficult to come out from the engaging groove 68, and the cover section 70 and the peripheral section of the main section 60 are integrally engaged with each other securely and firmly.

Figure 11:
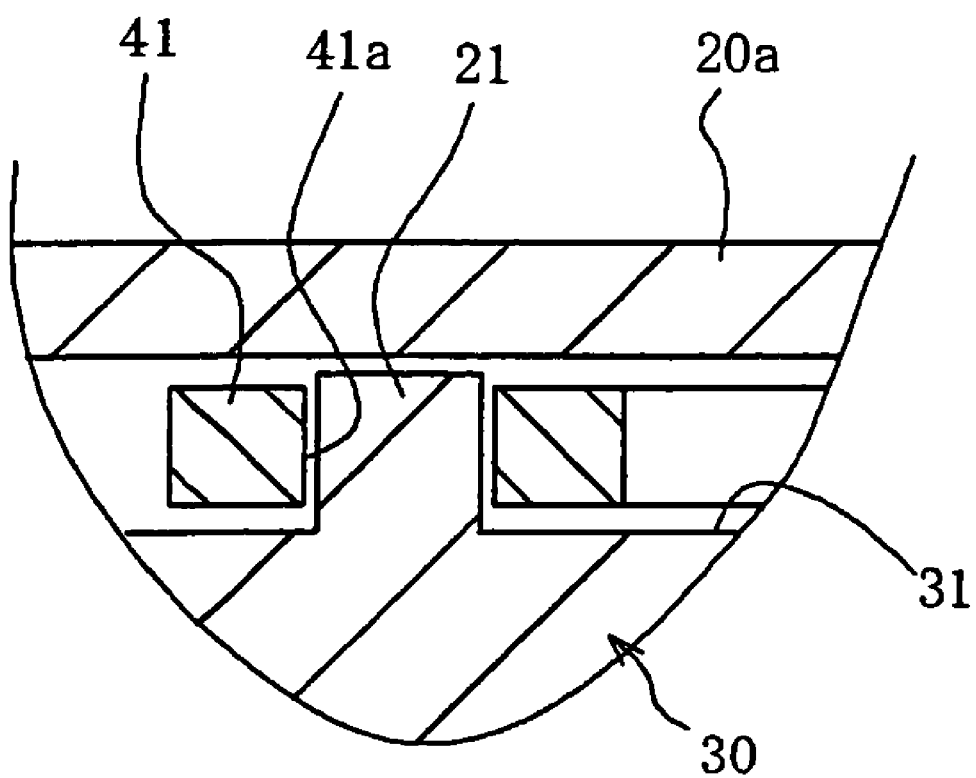
FIG. 11 is an enlarged sectional view showing part of a fulcrum shaft.

FIG. 11 is an enlarged fragmentary sectional view showing part of the fulcrum shaft 21. The fulcrum shaft 21 is integrated with the switch holder 30 and is fitted into the fulcrum shaft hole 41*a*. The fulcrum shaft hole 41*a* is provided in the fulcrum shaft boss 41 of the operation lever 10. The fulcrum shaft boss 41 is held between the side wall 20*a* of the base 20 and the side face 31 of the switch holder 30. The tip end of the fulcrum shaft 21 is disposed close to the side face wall 20*a*. With this configuration, the fulcrum shaft boss 41 is rotatable around the fulcrum shaft 21 without being detached from the fulcrum shaft 21.

Figure 12:
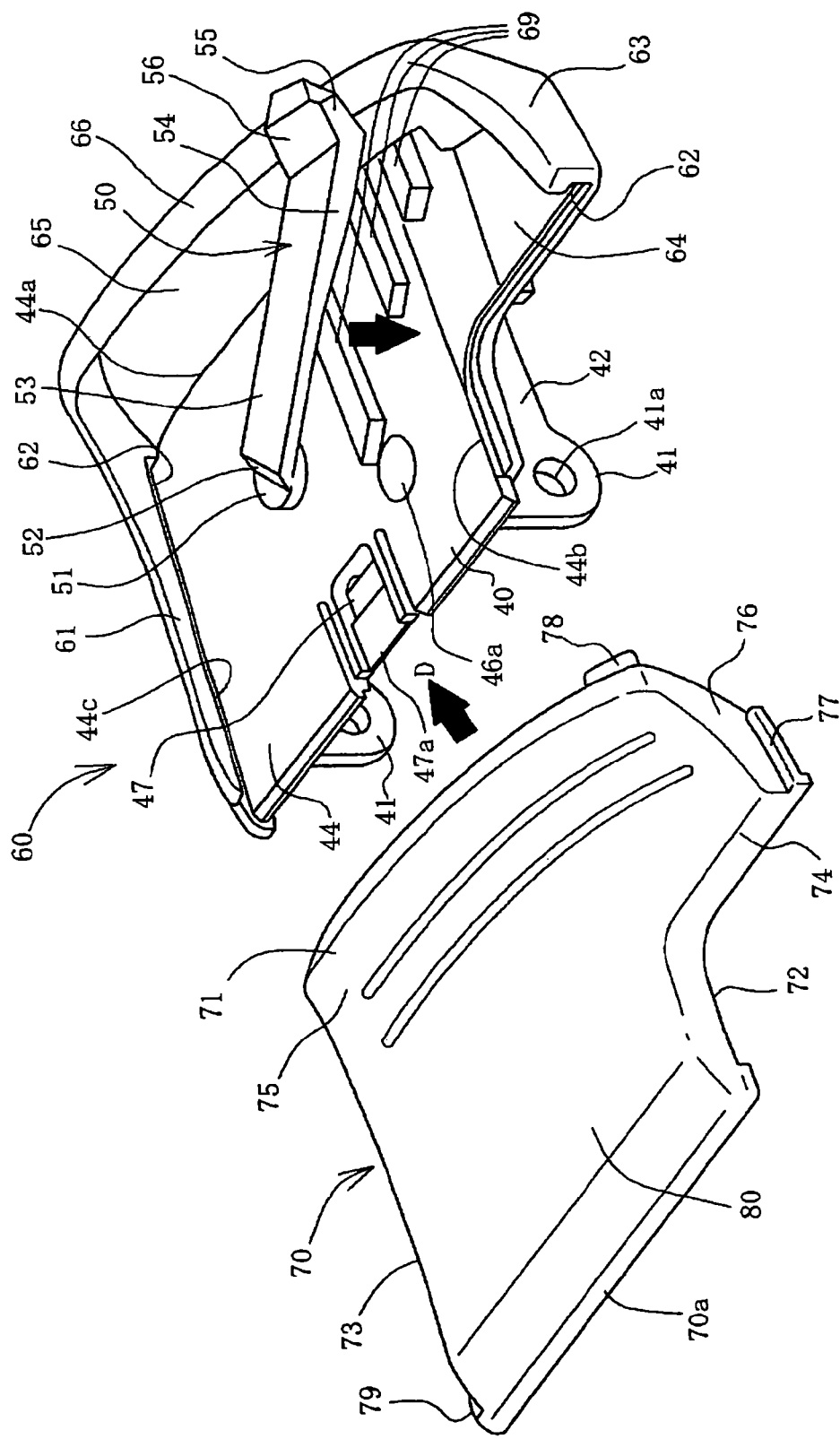
FIG. 12 is an exploded perspective view showing the operation lever of the lever switch.
Figure 13:
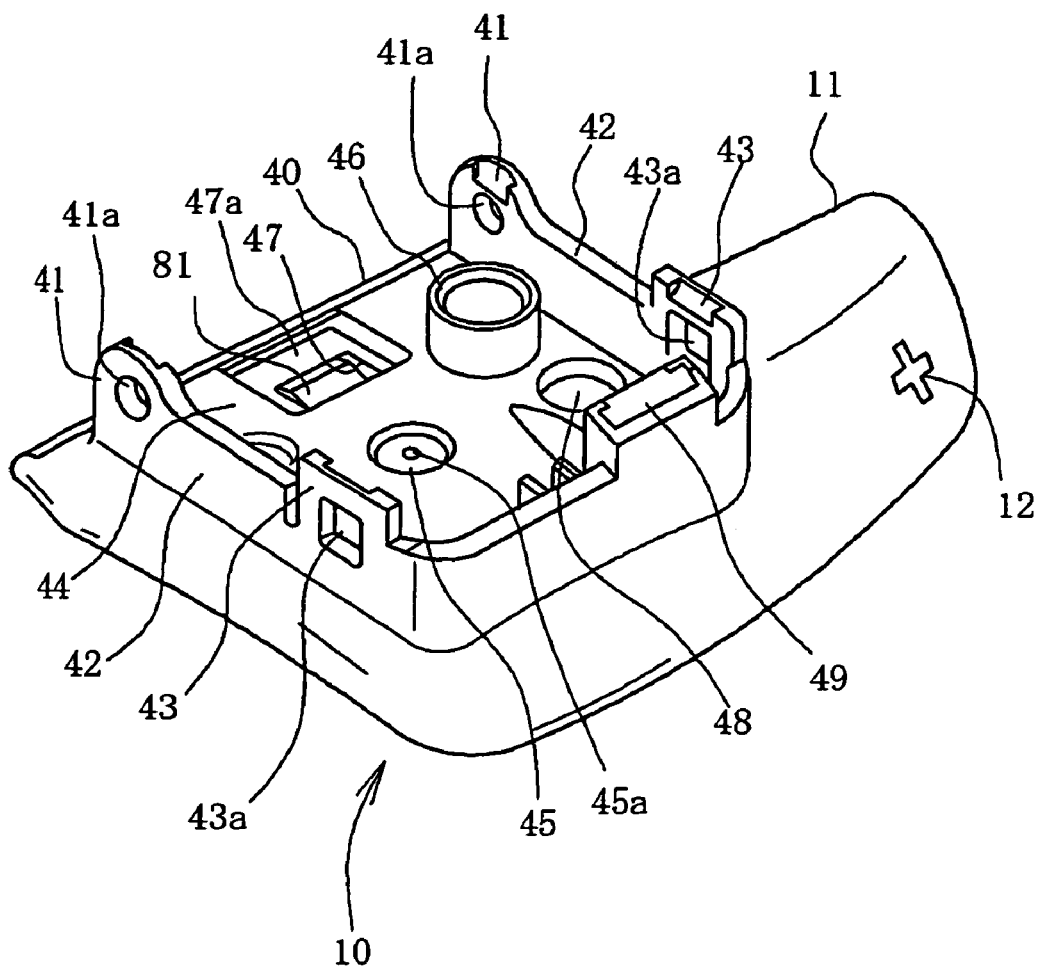
FIG. 13 is a perspective view showing the rear side of the operation lever in the assembled state.

FIG. 12 is an exploded perspective view showing the operation lever 10, and FIG. 13 is a perspective view showing the integrated state of the operation lever 10. In FIG. 13, the structure of the rear face of the main section 60 serves as the rear face of the operation lever 10. In FIG. 12, among the peripheral sections of the flat section 44, the section opposed to the base end section 40 is a tip end section 44*a*, the upper section in the state when the operation lever 10 is mounted on the steering wheel 1 is an upper end section 44*b*, and the section opposed to this upper end section 44*b* is a lower end section 44*c*.

A lower wall 61 having a vertical wall shape is formed along the lower end section 44*c*. A guide groove 62 extending into the wall of the lower wall 61 is formed in parallel with the surface of the flat section 44 along the lower end section 44*c*.

An extension section 64 serves as the section of the main section 60 side of the protruding section 11 (see FIG. 4). The extension section 64 is formed so as to continuously protrude from the flat section 44 to a nearly half portion of the upper end section 44*b* on the side of the tip end section 44*a*. An upper wall 63 having a vertical wall shape is also formed at the end of the protruding section of the extension section 64. Another guide groove 62 is also formed in this upper wall 63.

The slope section 65 is formed continuously from the flat section 44 so as to be bent outward from the tip end section 44*a*. The overhanging fringe 66 is formed at the tip end of the slope section 65. The overhanging fringe 66 is bent so that its tip end is overlapped with the upper portion of the slope section 65 (see FIG. 10). The overhanging fringe 66 continuously extends to the lower wall 61 and the upper wall 63.

No vertical wall portion is formed at the base end section 40 of the flat section 44, and the cover section 70 can be slid from the base end section 40 and can be installed on the main section 60. A thin-wall section 47*a* and an engaging hole 47 are formed on the intermediate section of the base end section 40. When the cover section 70 is slid, an engaging pawl described later elastically deforms the thin-wall section 47*a* and enters the engaging hole 47. The engaging pawl is engaged with the fringe portion of the thin-wall section 47*a*.

One end opening 46*a* of the light-gathering cylinder section 46 is provided at the center portion of the flat section 44, and the light-gathering section 51 of the photoconductor 50 is fitted into the one end opening 46*a*. Multiple ribs 69 (three ribs in this embodiment) protrude from the surface of the flat section 44 and is provided in parallel with one another. The multiple ribs 69 extend from the periphery of the one end opening 46*a* toward the tip end section 44*a*. Tip end of the rib 69 located closer to the extension section 64 is shorter than the tip end of the rib 69 located farther to the extension section 64. As a result, the tip ends of the ribs 69 are arranged obliquely toward the extension section 64 from the one end opening 46*a*.

When it is assumed that the photoconductor 50 is long and has a nearly band plate shape, that the side of the photoconductor 50 on the side of the light-gathering section 51 is the base end section of the photoconductor 50 and that the side on which the slope section 55 is provided is the tip end section of the photoconductor 50, the thickness of the photoconductor 50 changes so as to become slightly wider and thicker toward the tip end section. The light-gathering section 51 is fitted into the one end opening 46*a*. The slope section 55 is aligned with the slope section 65 of the main section 60 of the operation lever 10. The tip end section is fitted inside the overhanging fringe 66. The side face of the intermediate section is made contact with the tip ends of the ribs 69. With this configuration, the photoconductor 50 is positioned obliquely as shown in FIG. 12. Hence, even when the cover section 70 is slid above the photoconductor 50, the photoconductor 50 is not displaced, but can be accurately positioned and secured. Furthermore, since one end of the light-gathering section 51 is fitted into the light-gathering cylinder section 46, the one end of the photoconductor 50 can also be positioned and made harder to be displaced.

The cover section 70 has a base end section 70*a*, a tip end section 71, an upper end section 72, a lower end section 73, an extension section 74, a slope section 75 and a flat section 80 so as to correspond to the configuration of the main section 60 of the operation lever 10. The extension section 74 is the portion of the protruding section 11 on the side of the cover section 70.

The tip end section 71 is fitted inside the overhanging fringe 66 beyond the tip end section 44a of the main section 60 of the operation lever 10. An upper fringe section 76 having a nearly triangular shape is formed at the end section of the slope section 75 on the side of the extension section 74.

A sliding protrusion 77 and an engaging protrusion are formed so as to be integrated with the upper fringe section 76 and to protrude from the upper fringe section nearly horizontally. The sliding protrusion 77 is formed at the low position of the upper fringe section 76 so as to be aligned with the surface of the extension section 64. The engaging protrusion 78 is formed continuously from the tip end section 71 at the high position of the upper fringe section 76.

When the cover section 70 is slid to the main section of the operation lever 10 and integrated with the main section 60, the upper fringe section 76 makes contact with the inner face of the upper wall 63. At this time, the lower end section 73 makes contact with the inner face of the lower wall 61.

Figure 14:
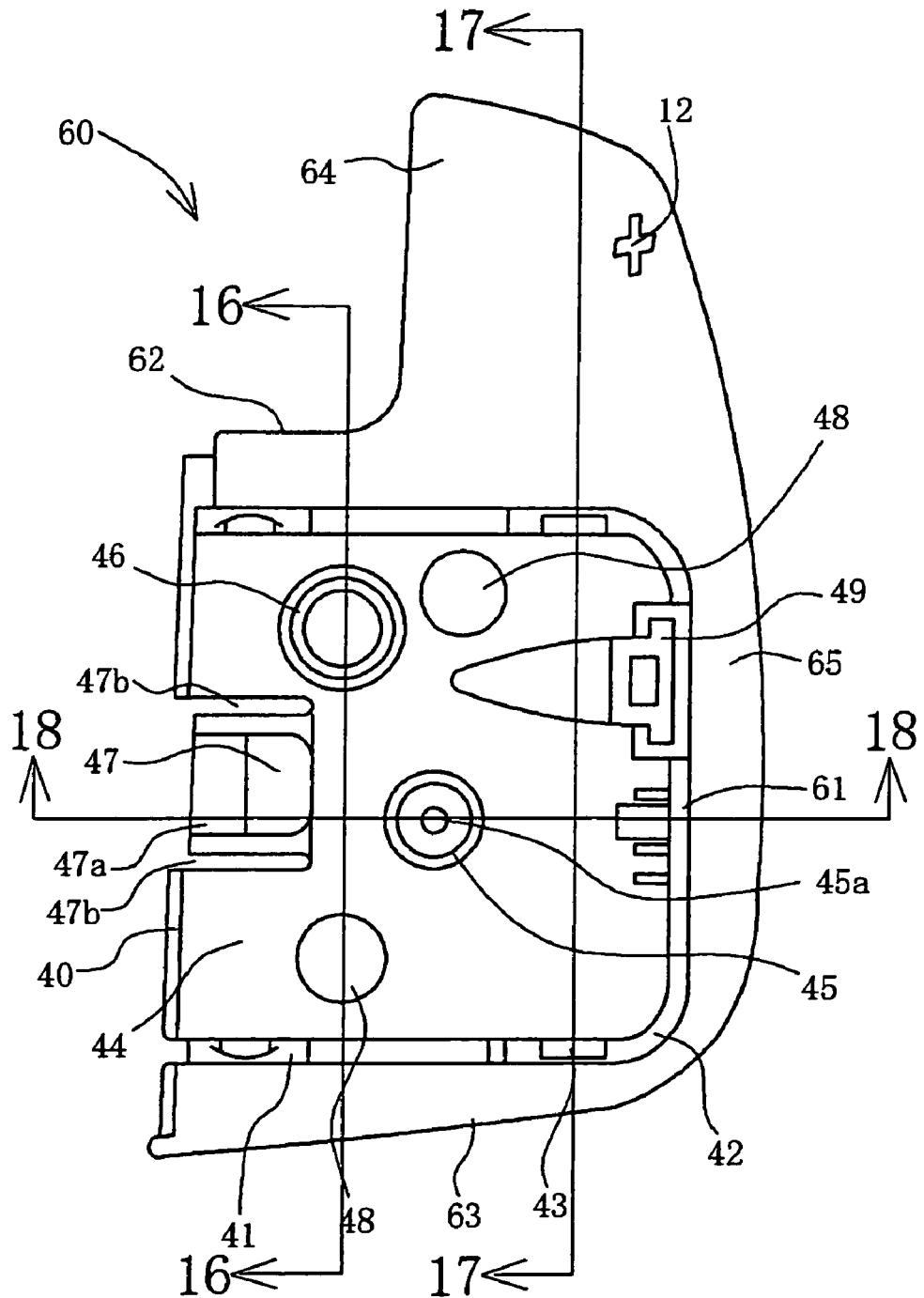
FIG. 14 is a view showing the rear face of the main section of the operation lever.

FIG. 14 shows the rear face of the main section 60 of the operation lever 10. Since the shape of the rear face of the main section 60 is the same as the shape of the rear face of the operation lever 10 shown in FIG. 13, the same numerals are used to designate the same portions as the rear face of the operation lever 10. The thin-wall section 47a and the engaging hole 47 are separated from the flat section 44 by slits 47b so that the thin-wall section 47a can be deformed easily.

Figure 15:
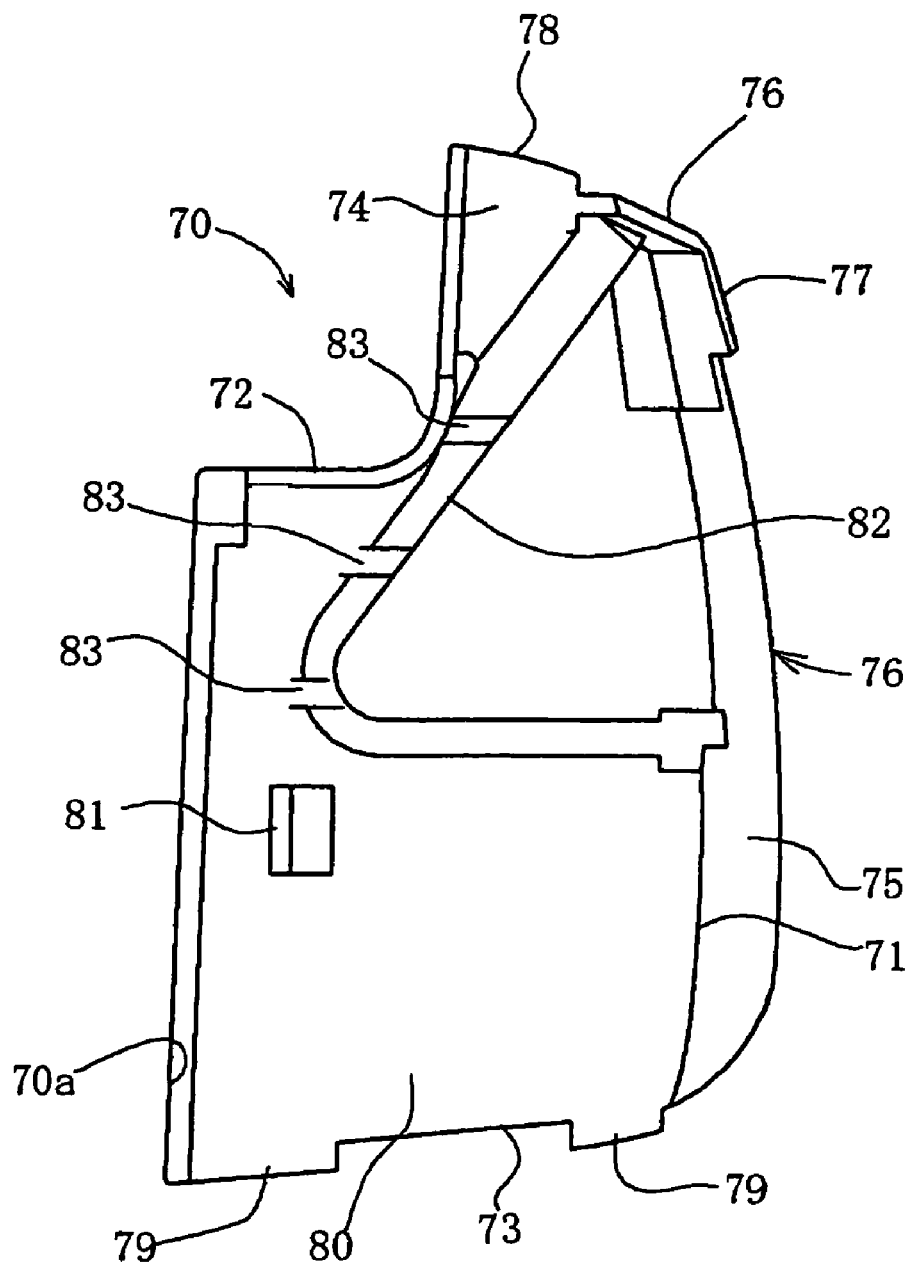
FIG. 15 is a view showing the inner face of the cover section of the operation lever.

FIG. 15 shows the inner face (to be aligned with the main section 60 of the operation lever 10) of the cover section 70. Sliding protrusions 79 are also formed on the lower end section 73 on the side of the base end section 70a so as to protrude from the lower end section 73. The Sliding protrusions 79 are fitted into the guide groove 62 (see FIG. 12) of the lower wall 61 and slidably movable thereto. An engaging pawl 81 is formed so as to protrude at a position close to the base end section 70a at the central portion of the flat section 80.

An inclined stepped section 82 is formed on the upper half side of the flat section 80. Ribs 83 are formed on the stepped section 82 so as to be integrated with the stepped section 82. The stepped section 82 is spaced from the tip end faces of the ribs 69 so that the photoconductor 50 is held between the stepped section 82 and the tip end faces of the ribs 69 (see FIG. 12) of the main section 60. Together with the stepped section 82, the ribs 83 are provided so as to correspond to the ribs 69 and to extend linearly in the sliding direction. The ribs 69 and 83 serve as positioning sections for positioning the photoconductor 50.

Figure 16:
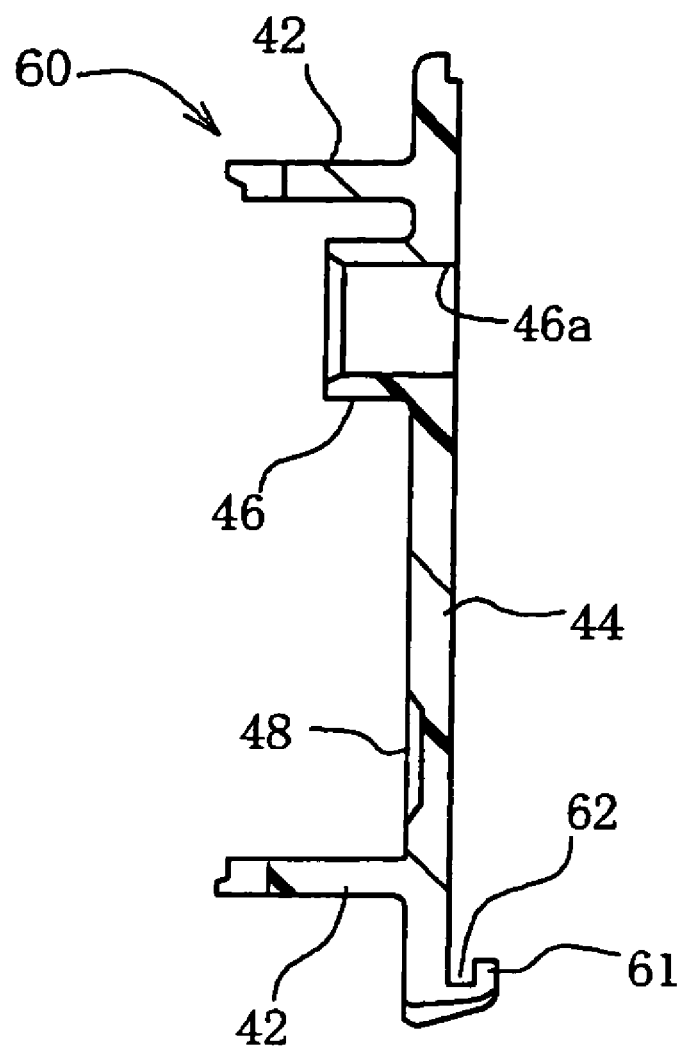
FIG. 16 is a sectional view taken on line 16-16 of FIG. 14.
Figure 17:
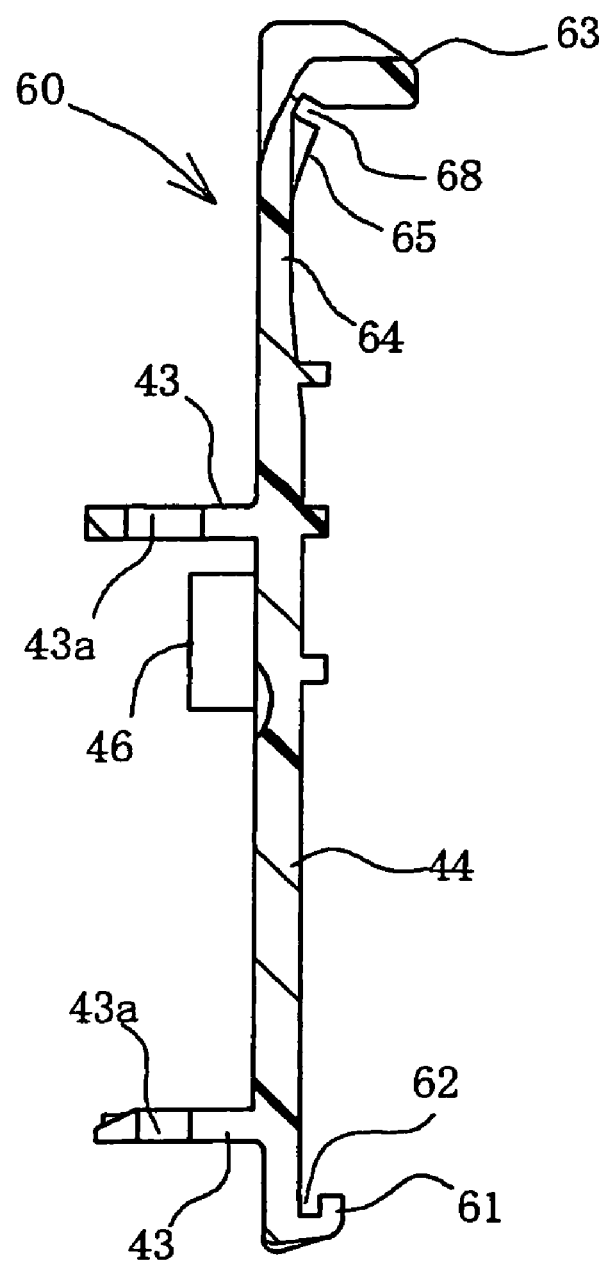
FIG. 17 is a sectional view taken on line 17-17 of FIG. 14.

FIG. 16 is a sectional view taken on line 16-16 of FIG. 14. FIG. 17 is a sectional view taken on line 17-17 of FIG. 14. As shown in FIGS. 16 and 17, the guide groove 62 is formed in the lower wall 61. Although the lower wall 61 and the upper wall 63 are partially aligned with the sliding protrusions 77 and 79, the lower wall 61 and the upper wall 63 overhang above the lower end section 73 and the upper fringe section 76 and are not aligned with the lower end section 73 and the upper fringe section 76. Hence the cover section 70 is allowed to slide with respect to the main section 60 of the operation lever 10.

Figure 18:
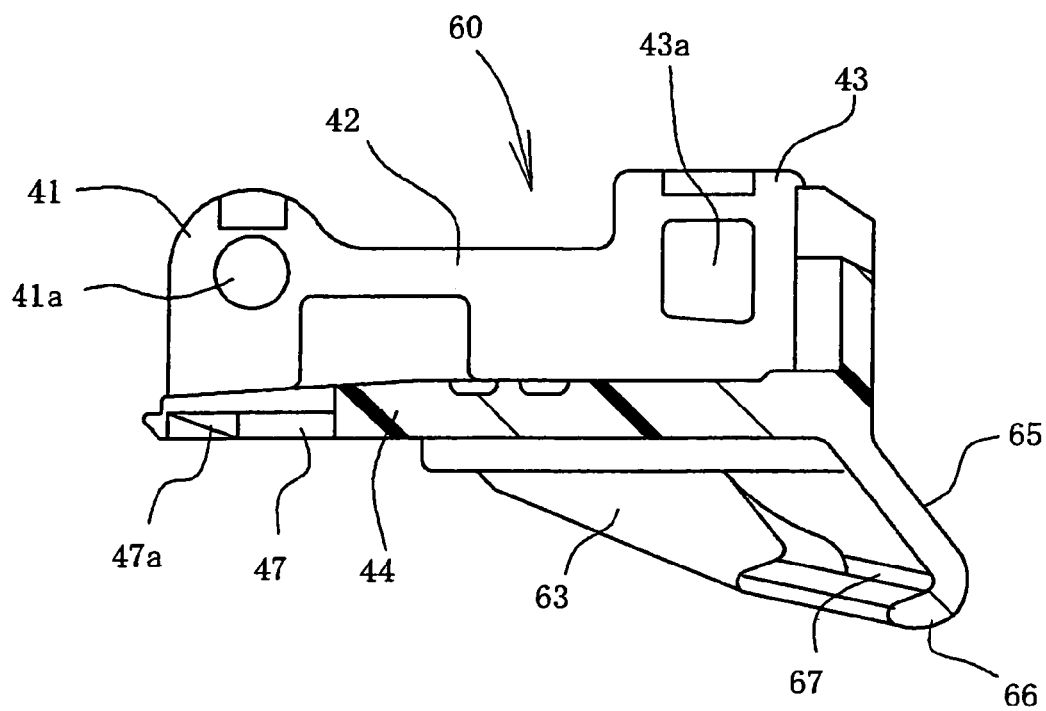
FIG. 18 is a sectional view taken on line 18-18 of FIG. 14.

FIG. 18 is a sectional view taken on line 18-18 of FIG. 14. The thin-wall section 47a and the engaging hole are formed at a portion of which the thickness is made smaller than the thickness of the flat section 44, so that the thin-wall section 47a can be elastically deformed easily.

Figure 19:
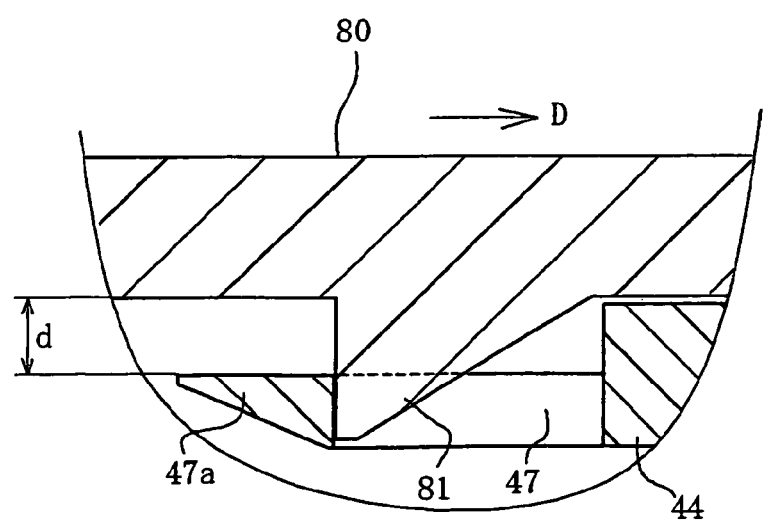
FIG. 19 is an enlarged sectional view showing the engaging structure of an engaging pawl.

FIG. 19 is an enlarged sectional view showing the engaging state of the engaging pawl 81 and the thin-wall section 47a. When the cover section 70 is slid with respect to the main section 60, since the engaging pawl 81 has an inclined face rising in the sliding direction D, the engaging pawl 81 elastically deforms the thin-wall section 47a. The engaging pawl 81 is inserted into the engaging hole 47 and engaged with the fringe portion of the thin-wall section 47a that faces the engaging hole 47. Furthermore, the thin-wall section 47a is formed into the shape of a step having a predetermined dimension d by removing the wall of the upper side of the flat section 44 as shown in FIG. 19. Therefore, even though the engaging pawl 81 is formed so as to protrude, the cover section 70 can be overlaid with the main section 60 so as to be made close contact with the main section 60. This configuration helps make the whole of the operation lever 10 thin.

Next, the operation of this embodiment will be described below. In FIG. 12, the photoconductor 50 is positioned on the main section 60 of the operation lever 10, the cover section 70 is overlaid on the main section 60, and then, the sliding protrusions 77 and 79 provided on the cover section 70 are inserted into the guide grooves 62 and then slid so as to move in the direction indicated by arrow D. The cover section 70 is thus pushed while the sliding protrusions 77 and 79 are guided by the guide grooves 62. Hence, the tip end section 71 is fitted inside the overhanging fringe 66, the engaging protrusion 78 is engaged with the engaging groove 68 (see FIGS. 10 and 17), and the engaging pawl 81 enters the engaging hole 47 simultaneously. As a result, the cover section 70 and the main section 60 of the operation lever 10 are integrated with each other with the photoconductor 50 held between the cover section 70 and the main section 60. The operation lever 10 is obtained in an assembled state.

At this time, the operation lever 10 can be obtained in the integrally assembled state only by placing the main section 60 and the cover section 70 face-to-face with the photoconductor 50 held between the main section 60 and the cover section 70 and by slidingly moving the cover section 70 and the main section 60 relatively. Hence, it is not necessary to provide screw-fastening bosses that are required for the related-art operation lever. For this reason, the operation lever 10 can be made much thin and the assembly work can be carried out promptly.

In addition, the tip end section 71 can be guided using the overhanging fringe 66 by fitting the tip end section 71 inside the overhanging fringe 66.

Furthermore, the operation lever 10 can be securely obtained in the integrally assembled state only by protruding the engaging protrusion 78 from the tip end section 71, engaging the engaging protrusion 78 with the engaging groove 68 provided inside the overhanging fringe 66 and pushing the cover section 70 in the sliding direction.

Moreover, the photoconductor 50 is simply held between the main section 60 and the cover section 70 of the operation lever 10. The photoconductor 50 can be installed easily and is not required to be disposed so as to avoid the screw-fastening bosses. Hence, the degree of freedom in the position and shape of the photoconductor 50 can be increased. The photoconductor 50 can be positioned more easily and fastened more securely. In particular, since the photoconductor 50 can be formed into a linear shape, the size of photoconductor 50 can be a required minimum size without providing unessential sections. Besides, since the operation lever 10 has a structure in which the photoconductor 50 is held between the main section 60 and the cover section 70, the strength of the operation lever 10 can be reinforced with the photoconductor 50. Furthermore, since the photoconductor 50 is held between the ribs 69 and the ribs 83, the photoconductor 50 is prevented from being displaced but can be securely positioned even when the cover section 70 is slid. The positioning sections for positioning the photoconductor 50 are not limited to the ribs 69 and 83, but can have various structures.

Furthermore, a slope section 55 formed on one end of the photoconductor 50 and serving as a reflecting plane 56 are provided. Hence, the areas of the reflecting plane 56 of the photoconductor 51 can be made larger. Still further, the surfaces of the slope section 55 formed at one end of the photoconductor 50 are used to serve as the reflecting planes 56. The slope section 55 of the photoconductor 50 is held between the slope section 65 of the main section 60 and the slope section 75 of the cover section 70. Hence, the slope section 55 having the reflecting planes 56 can be fastened securely, and the areas of the reflecting planes 56 can be made larger. Therefore, the positioning accuracy of the marked section 12 can be moderated to some extent. As a result, the degree of freedom in the shape, size, position, etc. of the marked section 12 can be enhanced, and the marked section 12 can be formed easily.

The present invention is not limited to the embodiment described above but can be modified and applied variously within the principle of the invention. For example, the guide grooves 62 serving as engaging sections may be provided on the cover section 70, and the sliding protrusions 77 and 79 may be provided on the main section 60 of the operation lever 10. Alternatively, the grooves and the protrusions may be provided so as to be distributed to both the members. Furthermore, this relationship between the grooves and the protrusions is similarly applicable to the relationship between the engaging hole 47 and the engaging pawl 81. Moreover, the marked section 12 can be provided on either one of the main section 60 and the cover section 70 of the operation lever 10.

Still further, the present invention is also applicable to the winker switch, the lighting switch, etc. that are installed on the steering column.

What is claimed is:

1. A lever switch, comprising:
    a base; and
    an operation lever attached rotatably on the base, said operation lever having a main section having a first engaging section, a cover section having a second engaging section and a photoconductor disposed between the main section and the cover section,
    wherein the main section opposes to the cover section, and the first engaging section engages with the second engaging section to integrate the main section and the cover section,
    wherein one of said first engaging section and said second engaging section is an overhanging fringe which is formed by bending inward a tip end section of one of the main section and the cover section, and the other of said first engaging section and said second engaging section is a fringe portion, and
    wherein said fringe portion fits inside said overhanging fringe.

2. The lever switch according to claim 1,
    wherein an engaging groove is provided inside said overhanging fringe, an engaging protrusion is provided on said fringe portion so as to protrude from said fringe portion, and said engaging groove engages with the engaging protrusion.

3. The lever switch according to claim 1,
    wherein said main section and said cover section have photoconductor positioning sections, respectively, and said photoconductor is held between said photoconductor positioning sections.

4. The lever switch according to claim 1,
    wherein said photoconductor has a slope section serving as a reflecting plane at one end section of said photoconductor, said slope section of said photoconductor is held between slope sections provided on the corresponding portions of said main section and said cover section, and said slope section of said main section or said cover section has a marked section for emitting light using the light guided to said slope section of said photoconductor.

5. A lever switch assembling method, comprising the steps of:
    preparing a main section having a first engaging section, a cover section having a second engaging section and a photoconductor,
    slidingly moving relatively the first engaging section to the second engaging section so as to integrate the main section with the cover section with the photoconductor while holding the photoconductor between the main section and the cover section,
    wherein, at the preparing step, one of said first engaging section and said second engaging section is an overhanging fringe which is formed by bending inward a tip end section of one of the main section and the cover section, and the other of said first engaging section and said second engaging section is a fringe portion, and
    wherein, at the slidingly moving step, said fringe portion fits inside said overhanging fringe.

* * * * *